Aug. 26, 1930.  R. ERBAN  1,774,175
VARIABLE RATIO GEAR
Filed Oct. 13, 1923  2 Sheets-Sheet 1
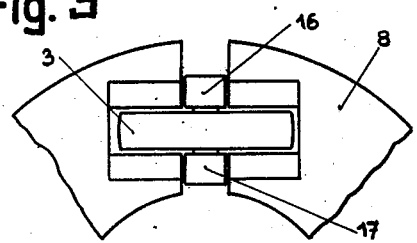
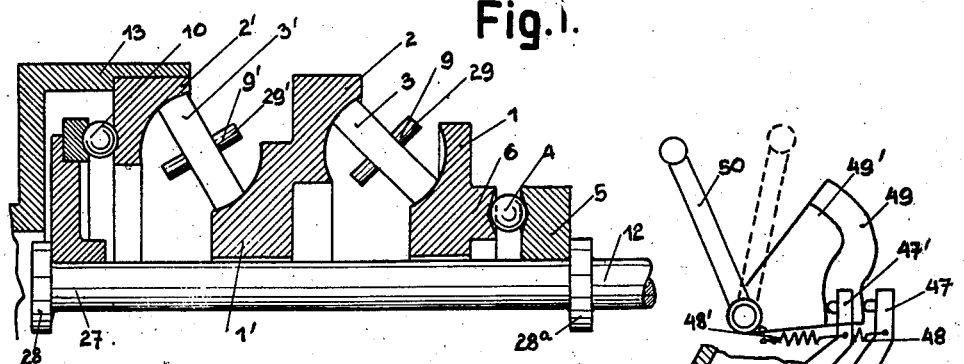
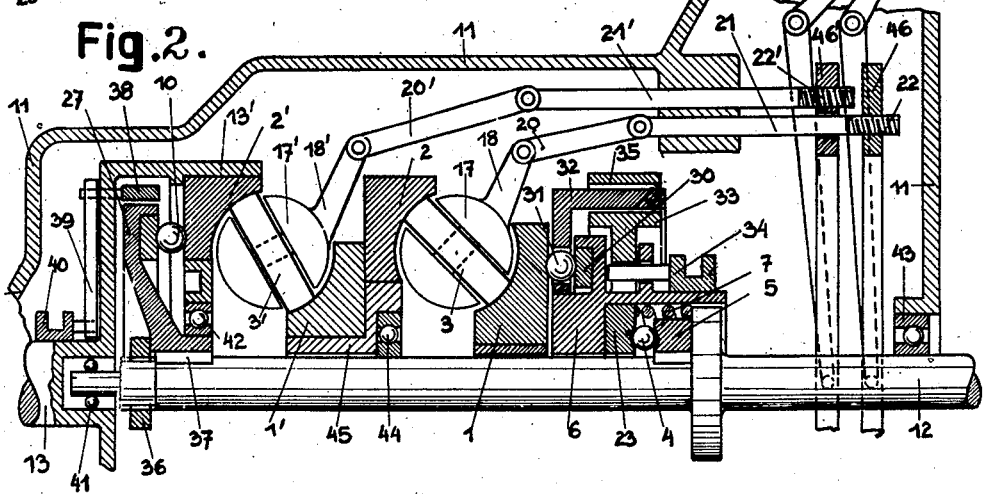

Aug. 26, 1930.   R. ERBAN   1,774,175
VARIABLE RATIO GEAR
Filed Oct. 13, 1923   2 Sheets-Sheet 2

Inventor
R. Erban
By Marks & Clerk

Patented Aug. 26, 1930

1,774,175

UNITED STATES PATENT OFFICE

RICHARD ERBAN, OF VIENNA, AUSTRIA

VARIABLE RATIO GEAR

Application filed October 13, 1923, Serial No. 668,342, and in Austria August 10, 1923.

This invention has for its object to provide an improved variable ratio gear of the general type specified, described and shown in my Patent 1,585,140, of May 18, 1926.

The present invention consists in a multistage tilting roller gearing, that is, a gearing comprising a number of speed multiplying and reducing gear mechanisms arranged in series, in which only a single automatic pressure-applying apparatus is arranged in such a manner as to produce in every stage exactly the particular pressure that corresponds to the particular torque produced in this stage quite irrespectively of the actual position of the rollers or the magnitude of the speed ratio. As a result of the fact that in none of the stages neither excessive pressures nor slipping of the rollers on their races can occur, whatever the position of the rollers may be, the improved gear will operate in every position of adjustment with one and the same degree of efficiency.

The improved gear is also suitable for all purposes, and in particular for use as a change-speed gear for motor cars where it can replace the toothed wheel gears with equal or even greater efficiency.

The invention also consists in an improved construction of the various parts and further features will be apparent from the following specification.

Various embodiments of the invention are illustrated by way of example in the accompanying drawings in which:

Figure 1 is a diagrammatic longitudinal section of a gear arranged according to this invention.

Figure 2 is a view corresponding to Fig. 1 and shows an embodiment of the gear according to the invention which is especially suitable for use as a change speed mechanism in motor-cars.

Figure 3 is a plan in diagram of the mounting of the tilting rollers of such a gear.

Figure 6 is a partial elevation of the pan thereof.

Figures 4, 5:
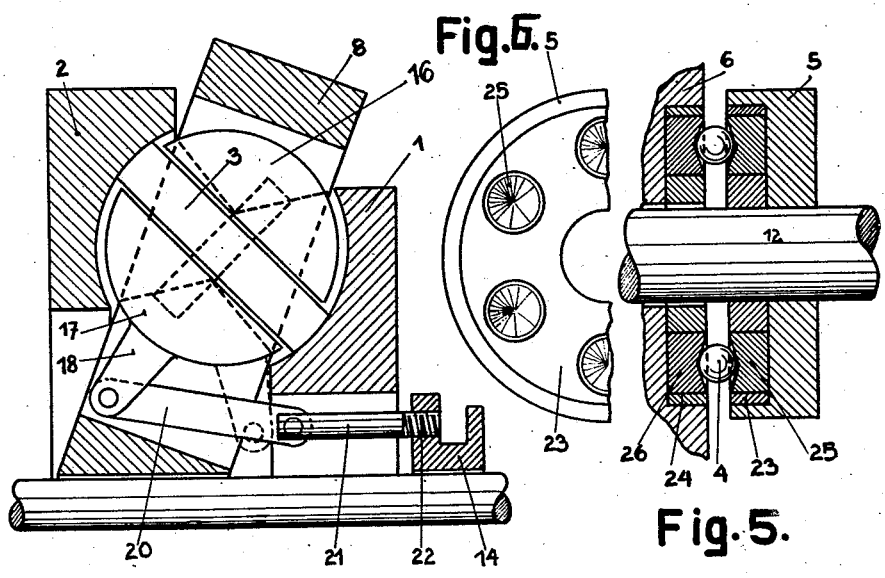
Figure 4 illustrates the mounting of the tilting rollers with an interposed correcting member.
Figure 5 is a longitudinal section of a pressure-applying apparatus.

The gear shown diagrammatically in Figure 1 comprises two sets of tilting rollers for varying the speed and also a pressure device of the general type specified in the aforesaid prior application Serial Number 603,418. 1 is an annular race loosely mounted on the shaft 12; it is fixedly connected to one (6) of the rings 5, 6 of the pressure device, or is made in one piece therewith. The other ring 5 is secured to the shaft 12. The axial or end thrusts are transmitted through the gear to the thrust bearing 10 which is mounted on a plate or disc 27 fixed on the shaft 12 and held by the collar 28. The second shaft is connected to the disc 13'. The rollers 3—3', respectively and their axles 9—9', respectively may be mounted in fixed cages (not shown for the sake of clearness of the drawing) so as to be capable of tilting. This mounting may consist either of tilting yokes, or the arrangement shown in Figures 3 and 4.

The mounting of the tilting rollers 3 in the cage must be such as to allow a certain amount of free movement to the rollers in order to compensate for any inexactness in the fitting.

A satisfactory mounting of the rollers is illustrated in detail in Figures 3 and 4. In both these figures only one roller 3 is shown, but it is to be understood that a plurality of such rollers are provided. The roller 3 is mounted on its axle 9 without any lateral play. This bearing may be a ball bearing or any other suitable bearing. The axle 9 is held fast in two segment-shaped flat members (hereinafter referred to as the sliding segments) 16 and 17 that are guided in a radial slot of the cage 8. These sliding segments are therefore able to move in any direction within the plane that is determined by this slot, but they cannot be moved in the peripheral direction in which the power is transmitted from the roller to the cage, because this direction is at right angles to the plane of the said slot. This construction thus assures a perfectly free and uniform adjustability of the rollers, whilst the symmetrical mounting prevents any tendency of the rollers to assume an oblique position under load.

The tilting of the rollers may be effected by means of a lever 18 which is fixed to the sliding segment 17. If however there should be various faults, due to the manufacture in the shifting mechanism of the several rollers, one and the same position of the collar may cause different amounts of tilting of the rollers, that is to say, the rollers will contact their races 1 and 2 in different circles. This will cause the rollers to work with different speed-ratios with consequent great wear and tear and loss of power. Since however it is almost practically impossible to assure absolute equality of exactness in the manufacture of the several shifting mechanisms, it becomes necessary to insert a correcting device in the shifting apparatus.

This correcting device comprises a link 20 and a sliding pin 21. When the collar 14, that effects the tilting of the roller 3, is moved the lever 18 comes into the position shown by the broken lines, and the sliding pin 21 together with the link 20 moves to the right in Fig. 5. The pins 21 of all the rollers 3 are connected by fine screw-threads 22 to the common collar 14. By means of these fine screw-threads 22, the pins 21 can be adjusted, and thus correction can be made for any want of uniformity between the levers, links &c.

A suitable construction of a pressure-applying apparatus comprising more than two balls, is illustrated in Figure 5 in longitudinal section and in Figure 6 in partial elevation. The balls 4 are located on both sides in cylindrical steel pans fitted accurately in cylindrical bores in the intermediate rings 23 and 24, and they transmit the pressure of the balls 4 to the thrust rings 5 and 6. The bores in the rings 23 and 24 are preferably produced by one and the same operation, so that any faults of manufacture of inaccuracies in dividing will be the same for both rings, and therefore the pans 25 and 26 will be situated exactly opposite each other. In order to effect a uniform bearing and consequently uniform distribution of the load on all the balls (in Fig. 5 the balls are assumed to be six in number), the pans must all have the same depth. As the pans can be made separately, any desired exactness of depth of the pans and uniformity of their inclined surfaces (shown as cones in the figure) can be attained.

In Figure 1 it is assumed that the cages of the two gears arranged in series with one another are held fast, so that the annular races rotate in opposite directions. 1 is the inner, and 2 is the outer annular race of the first gear. 1' and 2' are the corresponding annular races of the second gear. The race 1 is connected by means of the shaft 12 to the pressure-applying device 4—5—6. Race 2 is fast with race 1' or is made in one piece therewith. Race 2' which rotates in the same direction as the shaft 12, is connected to the hollow shaft 13'. The thrust bearing 10 which is held against the outer race 2' by means of the fixed collar 28 of the shaft 12 and the plate 27, rotates therefore at a speed that is equal to the difference between the rotational speeds of the two shafts 12 and 13. This construction is therefore particularly suitable for gears in which this difference is not very great, such as motor-car gears. The use of a common pressure-applying device for a plurality of gears arranged in series with one another entails however certain drawbacks which must be remedied by the provision of special means.

Those drawbacks are the following:

It is assumed that two approximately identical gears are employed and that the tilting rollers of the two gears are situated in similar positions, that is to say, the axles 9 and 9' of the rollers are inclined at equal angles to the common shaft 12. The angle of the axles of the rollers with the gear shaft will now be referred to shortly as "axle angle." If now it be assumed that the first gear at a determined axle angle (axle position 29) gives a speeding-down ratio of 1:2, then race 2, will rotate at half the rotational speed of race 1, and will transmit double the torque of the latter. Consequently the peripheral force that must be transmitted to the rollers 3' by race 1' (fast with race 2) must be double the peripheral force that is transmitted by race 1 to the rollers 3. In order to effect the transmission of the peripheral force without slip, between races 1' and 2' and the rollers 3' there is required therefore double the pressure-applying force as is required between the races 1 and 2 and the rollers 3. Since the same axle angle has been assumed for both systems the above stated ratio of the pressure-applying forces predicates the same ratio between the requisite axial thrusts upon the races.

The consequence of the two gears arranged in series having a common axial thrust is that the first gear is pressed with double the force that would be necessary, and this drawback is the more harmful, because the first gear rotates at double the speed of the second gear.

This drawback which entails increased loss of power and increased wear and tear can be remedied by the following means. When the races are pressed together with a constant axial thrust, the pressure-applying force (frictional pressure) between the rollers and the races is dependent upon the axle angle of the rollers 3, and is greater the smaller the axle angle. For an angle of 0° the frictional pressure is infinitely great, whilst for an axle angle of 90° it is equal to the axial thrust. In the present case the axial thrust is determined by the dimensions of the pressure-applying device 4—5—6 and the torque to be transmitted by the shaft 12; that is, it is constant for a given torque. The pressure-applying device is therefore so designed that the axial thrust (taking into consideration the axle angle of the first gear, axle position 29), is fully sufficient to produce the frictional pressure that is necessary to transmit the peripheral force without slip from race 1 to the rollers 3. The rollers 3' of the second system are now given a smaller axle angle (axle position 29') in such a manner that the frictional pressure which in this system is increased by this diminution of the angle, shall likewise suffice to transmit the power without slip; as a matter of fact, in the present example it is double.

If the first system had a speed ratio of 1:3, the axle angle of the second system would have to be diminished until the frictional pressure has attained a three-fold value. If the diminution of the diameter of the contact circle of the rollers 3' on the race 1' be taken into consideration, which occurs when the axle angle is diminished and which produces an increase of the peripheral force for the same torque, the axle angle should for this reason really be somewhat further diminished than as stated in the present example. It is only for an axle angle of 90° that equal diameters of the contact circles are obtained, assuming equal frictional pressures for both systems.

In series-connected tilting roller gears the rollers have hitherto been located in similar positions relatively to one another, and the tiltings (tilting angles) have likewise been approximately equal in amount. The tilting rollers of the several gears may however have different axle angles, and the rollers may be tilted through different angles, for the purpose of altering the speed ratios. In such cases in order to enable all the sets of rollers to be tilted by means of a single operating lever, one at least of the two sets or systems is adapted to be adjusted by means of cams. These cams may be in the form of rolling cranks, tappets or other devices. In most cases it will be necessary, in order to avoid cams that are too difficult to make, to spread the irregularities of the adjustment angles over all the systems (two in the present example), and to adjust each system by means of a cam.

A motor-car gear designed on these lines is illustrated in longitudinal section in Figure 2. In this gear the two series-connected subgears 1—3—2 and 1'—3'—2' are adjusted by means of two cams by the actuation of a single lever. Further, provision is made, after the speed ratio of 1:1 has been adjusted, to allow of coupling the driving and driven shafts directly to each other, for the purpose of relieving the gear from load. The gear has also an idle-running position and a reverse speed.

The driving shaft 12 is mounted in a ball bearing 43 in the casing 11. To this shaft is secured the jamming ring 5 of the pressure-applying device 5—4—23. The spring 7 serves for providing the initial pressure. The pressure applying device is preferably constructed as shown in Figures 5 and 6. A ball thrust bearing 30—31 is interposed between the thrust ring 6 and the annular race 1 that is located loose on the shaft 12. One running face of this bearing is fixed in the thrust ring 6; the other running face is formed by grinding in the race 1. The cage 32 of this thrust bearing may be connected by a clutch 33 to the thrust ring 6 so that the parts 6, 30 and 32 may be able to rotate together. Then the balls 31 are prevented from rolling so that they carry the race 1 round with them. This position corresponds to forward running. The actuation of the clutch 33 is effected by means of the clutch sleeve 34. If the clutch is opened, the gear will run idle, because the balls can then roll freely. The reverse is obtained by holding the cage 32 fast by means of the band brake 35. The balls 31 then cause the race 1 to rotate in the reverse direction.

The mounting of the rollers 3 and 3' of the two gears is effected in the manner shown in Figure 4, by means of sliding segments in cages (not shown in Fig. 2 so as not to interfere with the clearness of the illustration). The two cages are made fast in the casing 11. The tilting of the rollers is effected by means of the levers 18 and 18', the links 20 and 20' and the sliding pins 21 and 21'.

All the sliding pins of each gear are fixed in a common carrier, the pins 21 of the first gear being fixed in the carrier 46 by means of the correcting screwthread 22, and the pins 21' of the second gear by means of the correcting screwthread 22' in the carrier 46'. The carrier for the thrust rods may be a ring as shown in Figure 2, or it may be a disc slidable by means of a collar along the shaft. The movements of the two carriers 46 and 46' may be effected directly by means of a cam moving over a concentric rotary cylinder, or indirectly by means of interposed levers. The last mentioned case is shown in Figure 2.

The rings 46 and 46' are moved by means of the levers 47 and 47' which are actuated in their turn by the cams 49 and 49'. Springs 48 and 48' assure the bearing of the levers against the cams. Both cams are adjusted by means of a common operating lever 50.

The outer annular race 2 of the first gear is connected to the inner race 1' of the second gear and is kept up against the shaft 12 by the sleeve 45 and bearing 44. The thrust bearing 10 is located in the same manner as in Figure 6 between the outer race 2' and a thrust disc 27. This thrust disc is slidable along the shaft by means of the screw 36, and is forced by the key 37 to revolve with the shaft 12. The race 2' is fixed permanently to the driven shaft 13 by means of the sleeve 13'. The driven shaft 13 is supported on the driving shaft 12 by bearings 41 and 42.

On the shaft 13 is a collar 40 which acts through the levers 39 upon the clutch 38 between the sleeve 13' and the thrust disc 27. When the clutch 38 is closed, the shafts 12 and 13 are connected directly to each other, in order to relieve the gear of load during this period of direct connection.

What I claim is:—

1. In a multistage change speed gearing a plurality of sets of tilting rollers arranged in series, a driving race ring and a driven race ring for each set of tilting rollers, the driving race ring of a set of the series being connected with the driven race of the preceding set of the series and a common pressure device for the entire series, the rollers of each set being arranged at a different angle with respect to the rollers of the other sets, so that the pressure components acting on each set correspond to the different torques to be transmitted by the various stages of the gear.

2. In a multistage change speed gear, a plurality of sets of tilting rollers arranged in series, axles for said rollers, a driving race ring and a driven race ring for each set of tilting rollers, the driving race ring of a set of the series being connected with the driven race of the preceding set of the series and a common pressure device for the entire series, the rollers of each set being arranged at a different angle with respect to the rollers of the other sets, so that the pressure components acting on each set correspond to the different torques to be transmitted by the various stages of the gear.

3. In a multistage change speed gear according to claim 2, segment-shaped sliding members carrying the axles of the tilting rollers, extensions on certain of said sliding members acting as rocking levers, cams arranged so as to be movable only in dependence upon each other, guide levers bearing against said cams, and connecting members interposed between the said guide levers and the rocking levers, the contours of the said cams being so shaped as to maintain definite angular relations between the axles of the rollers of the different stages.

4. In a change speed gear as specified in claim 2, cams movable upon a common axis, tilting mechanism for each set of rollers being operated by one of said cams, the contours of said cams being so shaped as to maintain the axes of the rollers of each set always at a different angle relatively to the axes of the tilting rollers of the other sets and a single shifting lever actuating said cams as a unit about their common axis and adapted to simultaneously operate all sets of tilting rollers for the purpose of changing the gear ratio.

5. In a change speed gear, race rings, rollers tiltable therebetween, a cage for said rollers having radial slots, sliding members mounted in said slots, axles for said rollers carried by said sliding members, the sliding members having a certain play in every direction within the planes of the slots, and means for changing the inclination of the axles of the rollers within the planes of the slots.

6. In a change speed gear, race rings, rollers tiltable therebetween and provided with axles, a cage for said rollers having slots, each of which extends in a plane through the geometrical axis of the gear, a pair of sliding members in each slot, being fastened to the axles of said rollers, and each pair having a certain free movement in the cooperating slot in every direction, a lever extending from one of each pair of sliding members, and means for simultaneously displacing said levers in an axial direction for varying the inclination of said rollers.

7. In a change speed gear, race rings and tiltable rollers in frictional driving contact therewith, said rollers being provided with axles, a cage for said rollers having radial slots, sliding members carrying the axles of said rollers mounted in said slots having certain play in every direction within the planes of the slots, levers extending from certain of said sliding members, and means for displacing said levers in an axial direction to vary the inclination of said rollers, said means acting upon said levers at points situated outside of the paths of said rollers.

In testimony whereof I have signed my name to this specification.

ING. RICHARD ERBAN.